US010650263B2

(12) United States Patent
Ida et al.

(10) Patent No.: US 10,650,263 B2
(45) Date of Patent: May 12, 2020

(54) MOBILE SURVEILLANCE APPARATUS, PROGRAM, AND CONTROL METHOD

(71) Applicant: NEC CORPORATION, Tokyo (JP)

(72) Inventors: Kenichiro Ida, Tokyo (JP); Hiroshi Kitajima, Tokyo (JP); Hiroyoshi Miyano, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 16/223,167

(22) Filed: Dec. 18, 2018

(65) Prior Publication Data
US 2019/0147282 A1    May 16, 2019

Related U.S. Application Data

(63) Continuation of application No. 15/561,548, filed as application No. PCT/JP2015/059747 on Mar. 27, 2015, now Pat. No. 10,192,128.

(51) Int. Cl.
G06F 3/0488 (2013.01)
G06K 9/20 (2006.01)
(Continued)

(52) U.S. Cl.
CPC ......... G06K 9/2081 (2013.01); G06F 3/0488 (2013.01); G06F 3/04845 (2013.01);
(Continued)

(58) Field of Classification Search
CPC ............... G06F 3/0488; G06F 3/04883; G06F 3/04845; G06F 3/0484
See application file for complete search history.

(56) References Cited

U.S. PATENT DOCUMENTS 6,696,945 B1    2/2004    Venetianer et al.
6,727,938 B1    4/2004    Randall
(Continued)

FOREIGN PATENT DOCUMENTS

JP    2000-513168 A    10/2000
JP    2002-229718 A    8/2002
(Continued)

OTHER PUBLICATIONS

Communication dated Aug. 21, 2018, from the Japanese Patent Office in counterpart application No. 2017-202480.
(Continued)

Primary Examiner — Andrea C Leggett
(74) Attorney, Agent, or Firm — Sughrue Mion, PLLC

(57) ABSTRACT

Provided is a technique for enhancing operability of a mobile apparatus. An information processing apparatus (2000) includes a first processing unit (2020), a second processing unit (2040), and a control unit (2060). The first processing unit (2020) generates information indicating an event detection position in accordance with a position on a surveillance image set in a first operation. The first operation is an operation with respect to the surveillance image displayed on a display screen. The second processing unit (2040) performs a display change process with respect to the surveillance image or a window including the surveillance image. The control unit (2060) causes any one of the first processing unit (2020) and the second processing unit (2040) to process the first operation on the basis of a second operation.

20 Claims, 16 Drawing Sheets

(51) Int. Cl.
*H04N 5/232* (2006.01)
*H04N 7/18* (2006.01)
*G08B 13/196* (2006.01)
*G06F 3/0484* (2013.01)

(52) U.S. Cl.
CPC ... *G06F 3/04883* (2013.01); *G08B 13/19682* (2013.01); *G08B 13/19684* (2013.01); *G08B 13/19689* (2013.01); *H04N 5/232* (2013.01); *H04N 5/23206* (2013.01); *H04N 5/23216* (2013.01); *H04N 7/181* (2013.01); *G08B 13/19602* (2013.01); *G08B 13/19691* (2013.01); *H04N 7/183* (2013.01)

(56) References Cited

U.S. PATENT DOCUMENTS

| | | | |
|---|---|---|---|
| 6,970,083 | B2 | 11/2005 | Venetianer et al. |
| 8,582,037 | B2 | 11/2013 | Stern et al. |
| 2006/0026521 | A1 | 2/2006 | Hotelling et al. |
| 2007/0064104 | A1 | 3/2007 | Ikeda |
| 2011/0199314 | A1 | 8/2011 | Laberge et al. |
| 2011/0285846 | A1 | 11/2011 | Lee et al. |
| 2013/0016998 | A1 | 1/2013 | Noguchi et al. |
| 2013/0083198 | A1* | 4/2013 | Maslan ............... H04N 7/188 348/155 |
| 2014/0232903 | A1* | 8/2014 | Oshima ............... H04N 5/3532 348/229.1 |

FOREIGN PATENT DOCUMENTS

| | | |
|---|---|---|
| JP | 2003-091370 A | 3/2003 |
| JP | 2007-88584 A | 4/2007 |
| JP | 2010-170573 A | 8/2010 |
| JP | 4976939 B2 | 7/2012 |
| JP | 2012-213042 A | 11/2012 |
| JP | 2013-140436 A | 7/2013 |
| JP | 2014-6671 A | 1/2014 |
| JP | 2014-064241 A | 1/2014 |
| JP | 2014-179923 A | 9/2014 |
| JP | 2016-099790 A | 5/2016 |
| WO | 2014/030667 A1 | 2/2014 |
| WO | 2014/050180 A1 | 4/2014 |

OTHER PUBLICATIONS

Nozomu Ozaki et al., "A Surveillance System Using Mobile Phone Based on Region of Interest" Mar. 2, 2011, pp. 33-37 (7 pages total).
Decision to Grant a Patent for JP 2017-508860, dated Sep. 8, 2017.
International preliminary report on patentability for PCT/JP2015/059747, dated Feb. 22, 2017.
Apple, iPhone User Guide for iOS 7, Oct. 2013, pp. 1-158.
International Search Report for PCT/JP2015/059747, dated Jun. 16, 2015.
Notice of Allowance for U.S. Appl. No. 16/223,177 dated Dec. 16, 2019.
Office Action dated Feb. 3, 2020 in Japanese Application No. 2019-078467.

* cited by examiner

MOBILE SURVEILLANCE APPARATUS, PROGRAM, AND CONTROL METHOD

CROSS REFERENCE TO RELATED APPLICATIONS

This application is a Continuation Application of U.S. patent application Ser. No. 15/561,548, filed Sep. 26, 2017, which is based on International Application No. PCT/JP2015/059747, filed Mar. 27, 2015, the entire contents of which are incorporated herein by reference.

TECHNICAL FIELD

The present invention relates to a mobile surveillance apparatus, a program, and a control method.

BACKGROUND ART

A surveillance system that performs surveillance using a video (hereinafter, referred to as a "surveillance video") captured by a surveillance camera or the like has been proposed. For example, a surveillance video is watched by an observer or analyzed by an analysis apparatus. Such a surveillance system is used for preventing occurrence of troubles in advance, or for early solving the occurred troubles.

In such a surveillance system, a mobile apparatus such as a smartphone or a tablet has started being used. For example, Patent Document 1 discloses a system for publishing a video of a surveillance camera to unspecified users. The users can access a server using a mobile apparatus, a personal computer, or the like to watch the video of the surveillance camera.

Further, there is a technique capable of setting a part of a surveillance image as a surveillance region in a surveillance system. For example, an image processing apparatus disclosed in Patent Document 2 is capable of setting a surveillance region using an input apparatus such as a mouse. Further, the image processing apparatus performs detection of an intruding object in the surveillance region.

RELATED DOCUMENT

Patent Document

[Patent Document 1] Japanese Patent Application Publication No. 2014-64241
[Patent Document 2] Japanese Patent No. 4976939
[Patent Document 3] WO2014/030667A

SUMMARY OF THE INVENTION

Technical Problem

In a mobile apparatus such as a smartphone or a tablet used in a surveillance system, both of setting of an event detection position (setting of a video surveillance line, setting of a surveillance region, or the like) and a process of changing display on a display screen (display change process) may be performed by a touch operation of a user. The setting of the event detection position is performed by specifying a position or a range of a video surveillance line or a surveillance region by an operation of sliding a finger on a display screen, a pinch-in or pinch-out operation, or the like, for example. Similarly, the display change process is performed by an operation of sliding a finger on a display screen, by controlling a pan-tilt-zoom (PTZ) function of a remote surveillance camera by a pinch-in or pinch-out operation or the like, by digital zooming (enlargement or reduction), by scrolling of the display screen, or the like.

In this way, a mobile apparatus used in a surveillance system causes poor operability for a user since different processes are executed in accordance with the same operation.

The present invention has been made in consideration of the above-mentioned problems. An object of the invention is to provide a technique for enhancing operability of a mobile apparatus.

Solution to Problem

According to an aspect of the invention, there is provided a mobile surveillance apparatus including: a first processing unit setting an event detection position with respect to a surveillance image, in accordance with a first operation with respect to the surveillance image displayed on a display screen; a second processing unit performing a display change process with respect to the surveillance image or a window including the surveillance image in accordance with the first operation, the display change process being other than the setting of the event detection position; and a control unit causing any one of the first processing unit and the second processing unit to process the first operation.

According to another aspect of the invention, there is provided a program for causing a computer to operate as the mobile surveillance apparatus according to the above-mentioned aspect of the invention.

According to still another aspect of the invention, there is provided a control method executed by a computer. The control method includes: a first processing step of setting an event detection position with respect to a surveillance image, in accordance with a first operation with respect to the surveillance image displayed on a display screen; a second processing step of performing a display change process with respect to the surveillance image or a window including the surveillance image in accordance with the first operation, the display change process being other than the setting of the event detection position; and a control step of causing any one of the first processing step and the second processing step to process the first operation.

Advantageous Effects of Invention

According to the present invention, a technique for enhancing operability of a mobile apparatus is provided.

BRIEF DESCRIPTION OF THE DRAWINGS

The above object and other objects, features, and advantages will be apparent from preferred embodiments to be described below and the following accompanying drawings.

DESCRIPTION OF EMBODIMENTS

Figure 1:
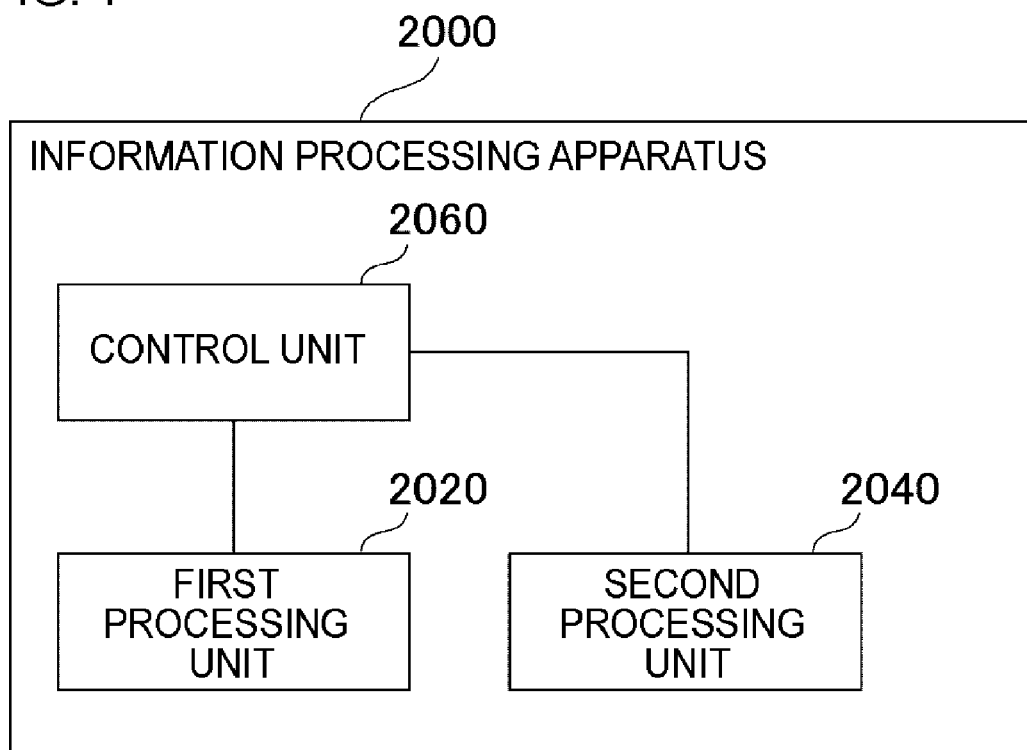
FIG. 1 is a block diagram illustrating an information processing apparatus according to a first example embodiment.

First, a background of the present invention will be described for ease of understanding of example embodiments of the present invention.

There is a case where an image or a document (for example, a web page), or the like including an image does not fit on a display screen or a window (hereinafter, referred to as "a display screen or the like"). For example, generally, in an application for handling maps, an image displayed on a display screen or the like corresponds to a map of only a partial place. Further, in a case where a resolution of an image is higher than a resolution of a display screen, only a part of the image fits on the display screen or the like as long as the size is not reduced. Further, there are many cases where a web page with a large amount of information does not fit on a display screen or the like. Particularly, since a display screen is small in a mobile apparatus, only a part of an image fits on the display screen or the like in many cases.

In a case where an image or a document does not fit on a display screen or the like, a user performs a predetermined operation to adjust a range of the image or the document that is shown on the display screen or the like. For example, the predetermined operation corresponds to a scroll operation, an enlargement operation, a reduction operation, or the like. For example, in the case of a map image, a user slides a user's finger on a touch panel that displays the map image in order to scroll the map image, and thereby changing a place shown on the display screen and watching a map of a desired place. In addition, for example, a user scrolls a document to watch a desired sentence, or the like. Furthermore, for example, a user performs an operation such as a pinch-in or pinch-out operation with respect to a map image to adjust a map scale.

In a case where a user performs surveillance using a surveillance video in a situation where an image or a document does not fit on a display screen or the like of a mobile apparatus in this way, for example, a user such as an observer performs the above-mentioned scroll operation or the like with respect to a document including a surveillance video or a surveillance image. By performing this operation, the user adjusts a range or the like of the surveillance video shown on the display screen and performs surveillance of a desired place.

Further, a pan-tilt-zoom (PTZ) function of a PTZ camera that acquires a surveillance image may be controlled by using an operation of sliding a finger or a pinch-in or pinch-out operation on a touch panel of a mobile apparatus that displays a surveillance video. Further, digital zooming or the like may be performed.

On the other hand, in a case where a detection position of an event is set, for example, in a case where a touch operation is performed on a touch panel with respect to a surveillance video to draw a video surveillance line to thereby set a surveillance region, it is intuitively preferable that the operation is an operation of sliding a finger or a pinch-in or pinch-out operation. However, such an intuitive operation is the same operation as a display change operation such as an operation of adjusting a range or the like of a surveillance video that is shown on a display screen or the like or an operation of controlling a PTZ function as described above, and thus, there is a problem in which the intuitive operation performed with respect to the surveillance video by a user has a double-meaning. For example, if a user performs an operation of sliding a user's finger to draw a video surveillance line in a surveillance video, a display screen may be scrolled without the video surveillance line being drawn.

As an example of an apparatus that provides an operation of specifying a region with respect to a map, there is a technique disclosed in Patent Document 3. In this technique, a user specifies a range with respect to a map, and an image of a seal is drawn in the specified range. However, in this technique, a situation where the map is scrolled when a user's finger is slid on the map is not taken into consideration, and the above-mentioned problem of the double meaning of the operation is not taken into consideration.

According to example embodiments of the present invention to be described hereinafter, the above-mentioned problem of the double meaning of the operation is solved, and operability of a mobile apparatus is enhanced. A surveillance apparatus using a mobile apparatus such as a smartphone or a tablet is referred to as a "mobile surveillance apparatus".

Hereinafter, example embodiments of the present invention will be described with reference to the accompanying drawings. In the drawings, the same reference numerals are given to the same components, and description thereof will not be repeated.

First Example Embodiment

FIG. 1 is a block diagram illustrating an information processing apparatus 2000 according to the first example embodiment. In FIG. 1, each block does not represent a unit of hardware configuration, but represents a unit of functional configuration.

The information processing apparatus 2000 includes a first processing unit 2020, a second processing unit 2040, and a control unit 2060. The first processing unit 2020 generates information indicating an event detection position (hereinafter, referred to as "event detection position information") based on positions on a surveillance image specified by a first operation. The first operation is an operation performed by a user on a touch panel 10 of a mobile apparatus that displays a surveillance image or the like. The event detection position is used for detection of an event in a surveillance system that uses the information processing apparatus 2000. Details of the event and the event detection position will be described later.

The second processing unit 2040 performs a display change process with respect to a display screen according to the first operation. For example, the display change process is a process of changing a range of a surveillance image displayed on the touch panel 10, the size of the surveillance image, or the like. Specifically, the display change process is a process of scrolling the surveillance image, or the like. Other examples of the display change process will be described later.

The control unit 2060 causes any one of the first processing unit 2020 and the second processing unit 2040 to perform the first operation.

<Processing Flow>

Figure 2:
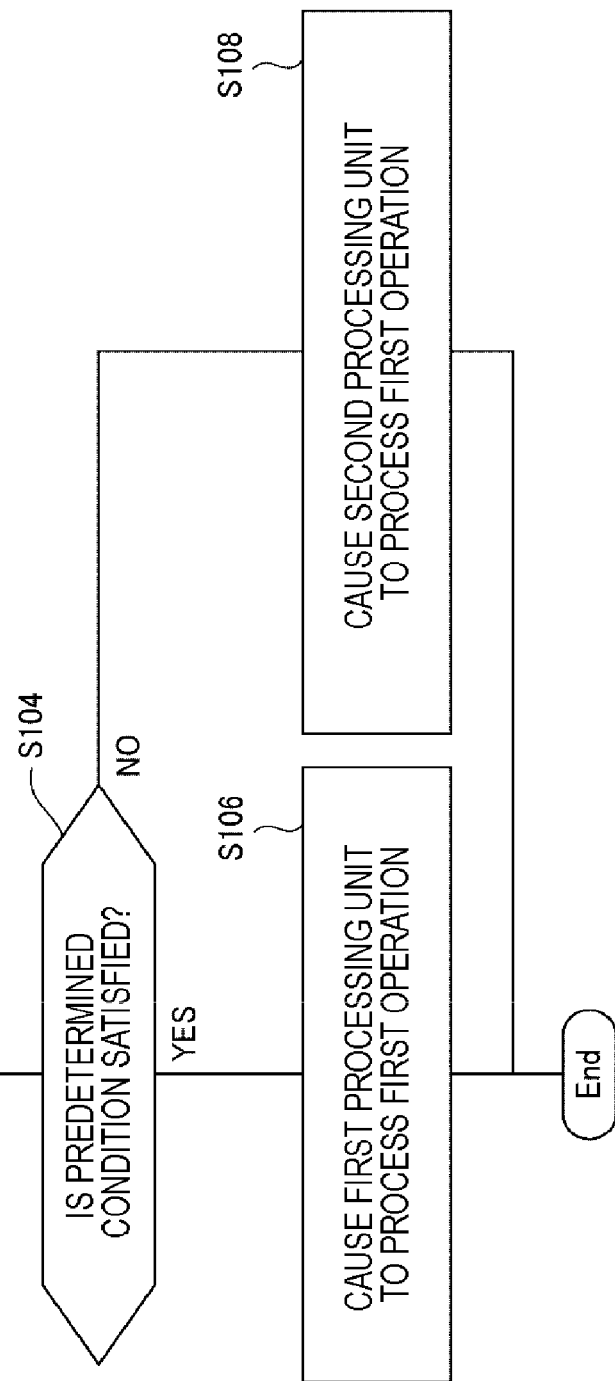
FIG. 2 is a flowchart illustrating a flow of processes executed by the information processing apparatus according to the first example embodiment.

FIG. 2 is a flowchart illustrating a flow of processes executed by the information processing apparatus 2000 of the first example embodiment. The control unit 2060 determines whether a predetermined condition is satisfied (S104). In a case where the predetermined condition is satisfied, the process of the control unit 2060 proceeds to step S106. In step S106, the control unit 2060 causes the first processing unit 2020 to handle the first operation.

On the other hand, in a case where the predetermined condition is not satisfied, the process of the control unit 2060 proceeds to step S108. In step S108, the control unit 2060 causes the second processing unit 2040 to handle the first operation.

<Advantageous Effects>

For example, as described later, an operation for sliding a finger on a surveillance image may be an operation of drawing a line (a video surveillance line or the like) indicating an event detection position, or may be an operation for scrolling a surveillance image (an operation for controlling a pan-tilt function of a PTZ camera that acquires the surveillance image, or the like). Further, a pinch-in or pinch-out operation on a surveillance image may be an operation of setting a surveillance region, or may be an operation for enlarging or reducing the surveillance image (an operation for controlling a zoom function (changing tele or wide) of a PTZ camera that acquires the surveillance image, or the like). In this way, in many cases, an intuitive operation for specifying an event detection position and an intuitive operation for changing display of a surveillance image or the like may be the same operation.

According to the present example embodiment, the first operation with respect to a surveillance image or the like is processed by any one of the first processing unit 2020 and the second processing unit 2040. In a case where the first operation is handled by the first processing unit 2020, the first operation means specification of an event detection position. In a case where the first operation is handled by the second processing unit 2040, the first operation means display change of the surveillance image or the like. In this way, according to the present example embodiment, the operation called the first operation with respect to a surveillance image or the like is processed as an operation for any one of specifying an event detection position and changing display of the surveillance image or the like based on a predetermined condition. Accordingly, a user of the information processing apparatus 2000 is able to specify an event detection position by the same operation as an intuitive operation for changing display of a surveillance image or the like. Accordingly, the user of the information processing apparatus 2000 is able to specify an event detection position by an intuitive operation.

Hereinafter, the present example embodiment will be described in detail.

<Hardware Configuration Example>

Respective functional components of the information processing apparatus 2000 may be realized by hardware (for example, a hard-wired electronic circuit, or the like) that realizes the respective functional components, or may be realized by a combination of hardware and software (for example, a combination of an electric circuit and a program that controls the electronic circuit, or the like).

Figure 3:
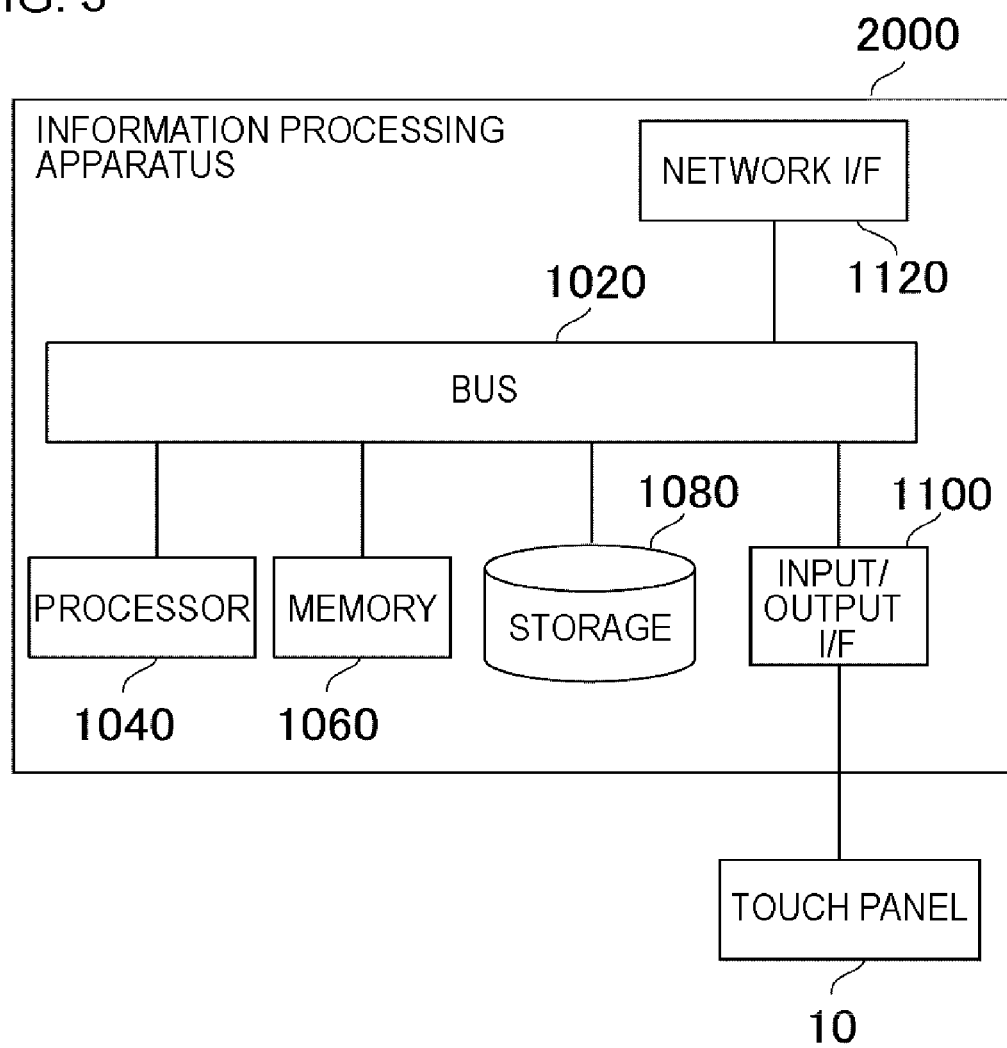
FIG. 3 is a block diagram illustrating a hardware configuration of the information processing apparatus.

FIG. 3 is a block diagram illustrating a hardware configuration of the information processing apparatus 2000. The information processing apparatus 2000 includes a bus 1020, a processor 1040, a memory 1060, a storage 1080, an input/output interface 1100, and a network interface 1120. The bus 1020 is a data transmission path through which the processor 1040, the memory 1060, the storage 1080, the input/output interface 1100, and the network interface 1120 mutually transmit and receive data. Here, a method for connecting the processor 1040 and the like to each other is not limited to bus connection. The processor 1040 is an arithmetic processing unit such as a central processing unit (CPU) or a graphic processing unit (GPU). The memory 1060 is a memory such as a random access memory (RAM) or a read-only memory (ROM). The storage 1080 is a storage such as a hard disk, a solid state drive (SSD), or a memory card. Further, the storage 1080 may be a memory such as a RAM or a ROM.

The input/output interface 1100 is an interface for connecting the information processing apparatus 2000 and an input/output device. The input/output device is a touch panel 10 for displaying a surveillance image or receiving an input of an operation with respect to the surveillance image, for example.

The network interface 1120 is an interface for connecting the information processing apparatus 2000 to an external apparatus to be able to communicate therewith. The network interface 1120 may be a network interface for connecting to a wired line, or may be a network interface for connecting to a wireless line.

The storage 1080 stores a program for realizing functions of the information processing apparatus 2000. Specifically, the storage 1080 stores program modules that realize functions of the first processing unit 2020, the second processing unit 2040, and the control unit 2060. The processor 1040 executes the program modules to realize the functions of the first processing unit 2020, the second processing unit 2040, and the control unit 2060. Here, in executing the respective modules, the processor 1040 may execute the modules after reading the modules in the memory 1060, or may execute the modules without reading the modules in the memory 1060.

The hardware configuration of the information processing apparatus 2000 is not limited to the configuration shown in FIG. 3. For example, the program modules may be stored in the memory 1060. In this case, the information processing apparatus 2000 may not include the storage 1080.

The information processing apparatus 2000 is implemented as a computer, such as a mobile apparatus (a smartphone, a tablet, or the like). The touch panel 10 is a touch panel that is normally installed in the mobile apparatus with which the information processing apparatus 2000 is implemented.

<As for Surveillance Image>

Figure 4:
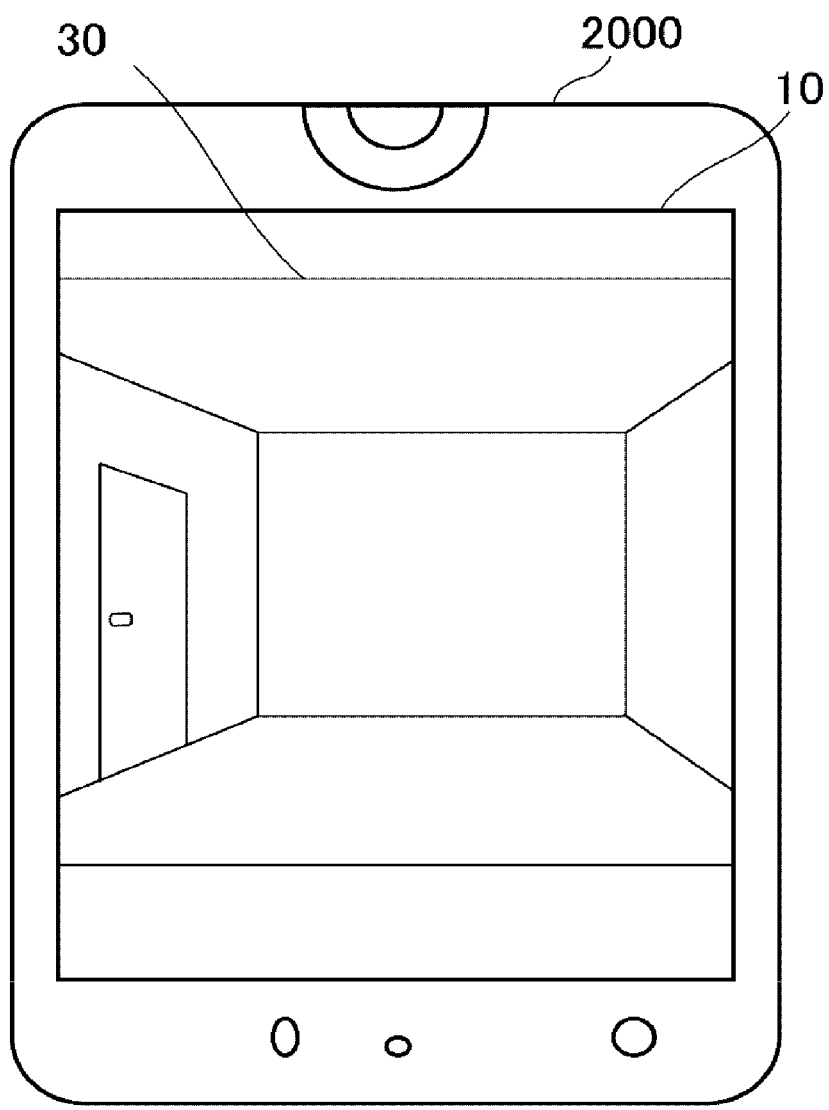
FIG. 4 is a diagram illustrating a surveillance image captured by a surveillance camera.

A surveillance image is an image to be used for surveillance of various places (important facilities such as a port, an airport, a terminal station, a platform, a power plant, a plant, or a dam, a warehouse town, a leisure facility, a sports facility, a stadium, a commercial facility, a building, a city, a street, or the like). Specifically, the surveillance image is an image captured by a surveillance camera provided at a place to be monitored. FIG. 4 is a diagram illustrating a surveillance image displayed on a touch panel of a mobile apparatus. In FIG. 4, a surveillance camera images a corridor in the building.

Figure 5:
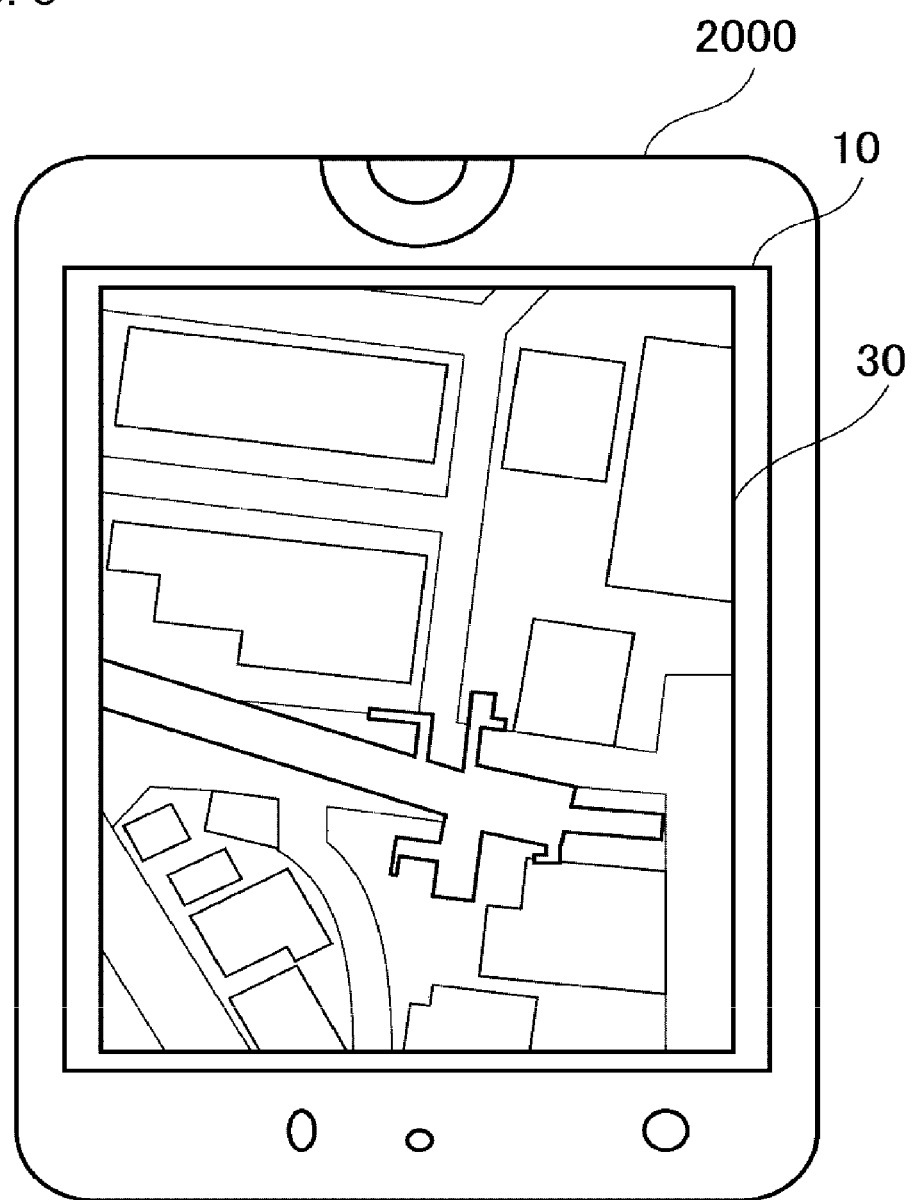
FIG. 5 is a surveillance image indicating a map of a surveillance area.

Setting of an event detection position is not necessarily performed on a surveillance image, and may be performed on an image obtained by imaging a place to be monitored from the sky (for example, an image imaged from a satellite) or on an image indicating a map of the place to be monitored. FIG. 5 is an image indicating a map of a place to be monitored that is displayed on a touch panel of a mobile apparatus.

Further, a map image does not display only a map, but may also has a meaning as a surveillance image that indicates, in real time, tracking information of a person or the like who is a target of an event detection.

In a case where the first operation is performed with respect to a surveillance image, the surveillance image may be one or a plurality of frames that constitute a video, or may be an image (photo) imaged as a still image.

The surveillance image may be an image that is imaged in real time, or may be an image that is imaged in the past.

For example, the surveillance image is stored in a storage (the storage 1080 in FIG. 3) inside the information processing apparatus 2000. Further, for example, the surveillance image may be stored in a storage provided outside the information processing apparatus 2000. In this case, the information processing apparatus 2000 acquires the surveillance image from the storage outside the information processing apparatus 2000. For example, the information processing apparatus 2000 may directly acquire from the surveillance camera the surveillance image imaged using the surveillance camera.

Figure 6:
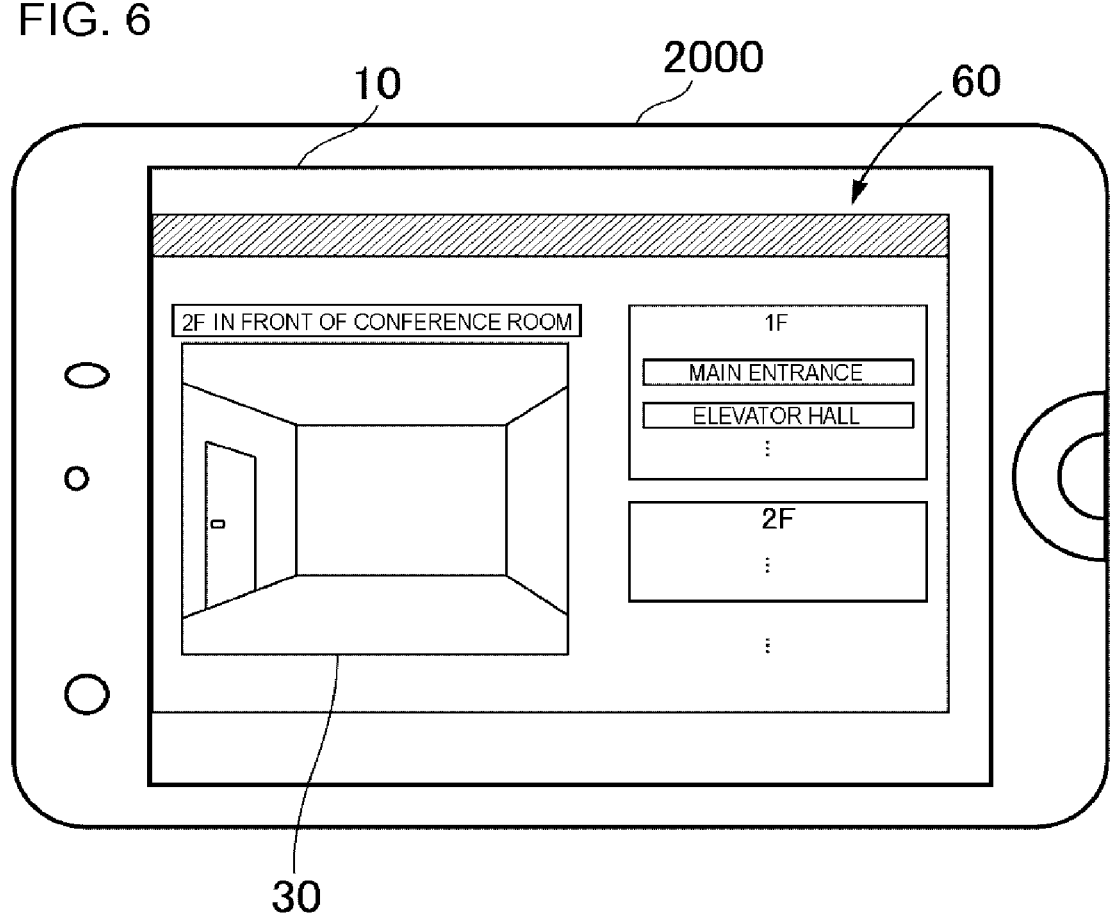
FIG. 6 is a diagram illustrating a window including a surveillance image.
Figure 7:
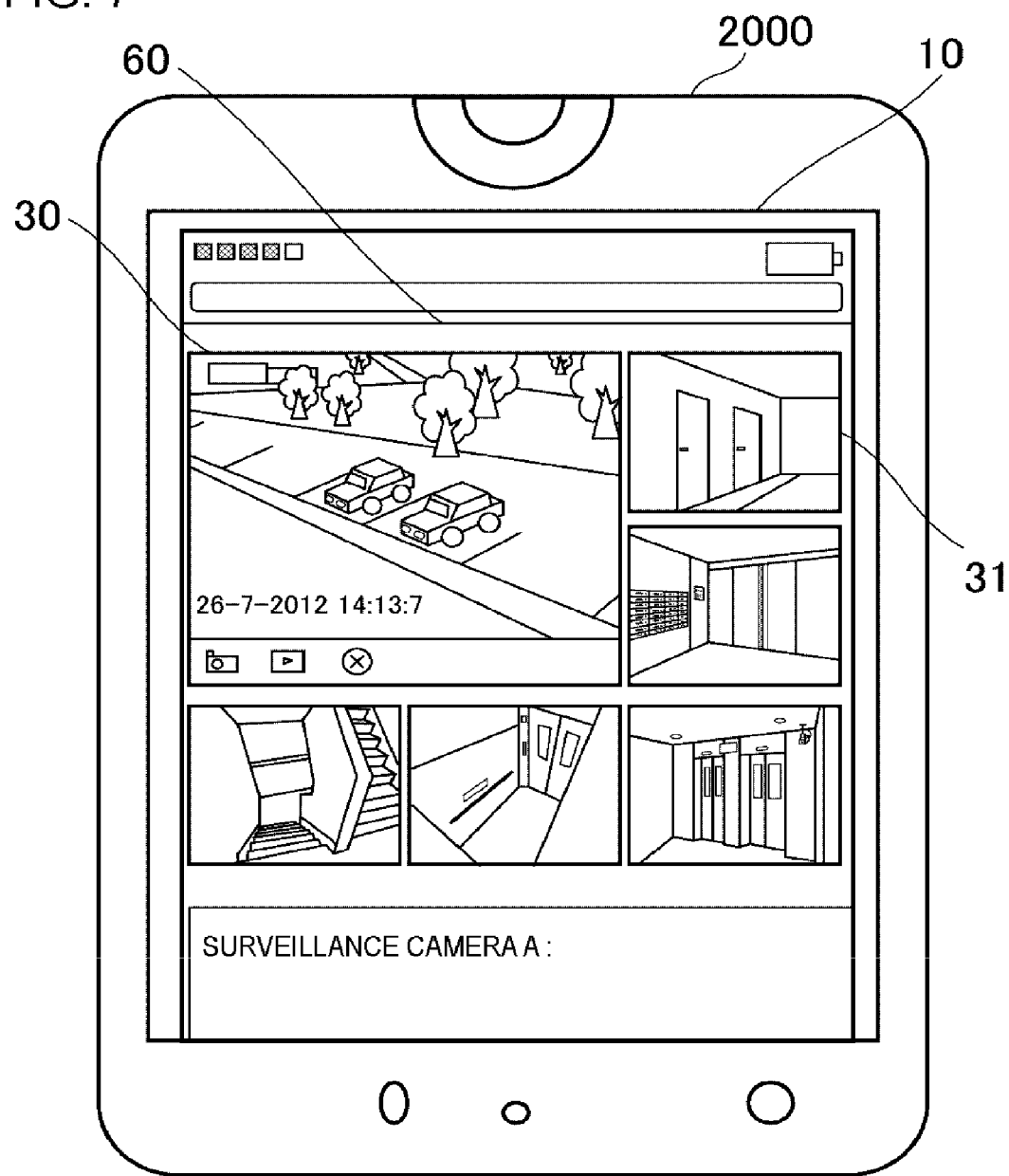
FIG. 7 is a diagram illustrating a window including a plurality of surveillance images.

The surveillance image may be independently displayed on the touch panel 10, or a window including the surveillance image may be displayed thereon. FIG. 6 is a diagram illustrating a window 60 including a surveillance image 30. Further, the window 60 may simultaneously include the main surveillance image 30 and a plurality of sub surveillance images 31. FIG. 7 is a diagram illustrating a window 60 including a plurality of surveillance images 30.

<As for First Operation>

The first operation is, for example, an operation of sliding a user's finger on the touch panel 10. The slide operation may be performed with one finger or a plurality of fingers.

Figure 8A:
FIGS. 8A-8C are diagrams illustrating a first operation.
Figure 8B:
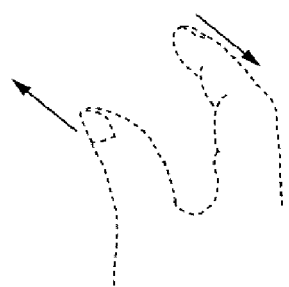
Figure 8C:
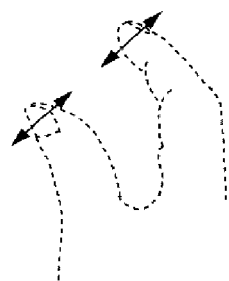

FIGS. 8A-8C are diagrams illustrating the first operation. FIG. 8A shows an operation of sliding one finger on the touch panel 10. FIG. 8B shows a rotating operation. For example, the rotating operation is an operation for rotating an image. FIG. 8C shows a pinch-in or pinch-out operation. Here, the first operation is not limited to these operations.

<Processes Performed by the Second Processing Unit 2040>

There are a variety of display change processes performed by the second processing unit 2040. For example, the display change process is a process of changing display of an image or a window in a general mobile apparatus or the like according to an operation performed with respect to the image or the window.

For example, the display change process is a process of scrolling the surveillance image or the like with response to an operation for sliding a finger with respect to the touch panel 10 that displays a surveillance image, a map image, or a window including the surveillance image or the map image (referred to as a "surveillance image or the like"). For example, the display change process is a process of rotating the surveillance image or the like, with response to an operation of rotating a finger with which the surveillance image or the like is held. Further, for example, the display change process is a process of reducing or enlarging the surveillance image or the like, with response to an operation of pinching in or pinching out the surveillance image or the like. The display change process is not limited to these examples.

The display change process includes a process of "based on a user's operation with respect to a surveillance image, controlling a PTZ function of a PTZ camera that generates the surveillance image, and changing display of the surveillance image as a result thereof". For example, the display change process is a process of scrolling a surveillance image as a result of controlling a pan-tilt function of a PTZ camera that generates the surveillance image with response to an operation of sliding a finger on the surveillance image. Further, for example, the display change process is a process of reducing or enlarging a surveillance image as a result of controlling a zoom function of a PTZ camera that acquires the surveillance image according to an operation of pinching in or pinching out the surveillance image (for changing tele or wide). Furthermore, the display change process includes a process of changing display of a surveillance image as a result of digital processing such as digital zooming.

<Processes Performed by the First Processing Unit 2020>

The first processing unit 2020 generates event detection position information. The event detection position information is used, for example, in a surveillance system that uses the information processing apparatus 2000. The event means a variety of phenomena to be detected in the surveillance system. For example, the event includes: passing of a person, an animal, a vehicle such as a car, or other objects (hereinafter, simply referred to as an "object") across a video surveillance line; a predetermined phenomenon of an object in a surveillance region (invasion, leaving, appearance, disappearance, invasion, leaving, appearance, disappearance, fighting, stagnation, wandering, tumbling, standing up, sitting down, change of a movement direction, going in the opposite direction, shoplifting, detouring, being injured, carrying away, leaving, graffiti, forming crowd, and etc.); movement of an object along a specific route defined by a line; and etc. The event detection position is used, for example, as a position indicating a video surveillance line or a surveillance region in the above-mentioned surveillance system.

The video surveillance line is a line superimposed on a surveillance image or the like by a user, and is a line used for detecting an object that crosses (passes through) the line. The video surveillance line may include an attribute of a direction (from right to left, from left to right, both directions, or the like), and may be designed so that an alert is output only in a case where there is the passsing of an object in the direction specified by a user. Further, the surveillance region may be a partial region of a surveillance image or the like set by a user, and is a region for detecting a predetermined event.

<<Example of Operation of Specifying Event Detection Position>>

Figure 9A:
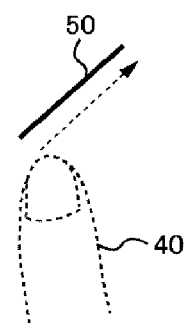
FIGS. 9A-9F are diagrams illustrating a situation where an event detection position is specified by the first operation.
Figure 9B:
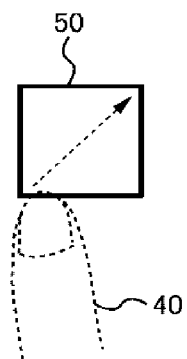

FIGS. 9A-9F are diagrams illustrating a situation where an event detection position is specified in accordance with the first operation. FIG. 9A shows a situation where an event detection position 50 indicated by a line is specified by the first operation of drawing the line using a finger 40. FIG. 9B shows a situation where an event detection position 50 indicated by a rectangular region is specified by the same operation as in FIG. 9A. In a case where an operation of FIG. 9A or FIG. 9B is processed by the second processing unit 2040, for example, the second processing unit 2040 scrolls the surveillance image or the window including the surveillance image.

Figure 9C:
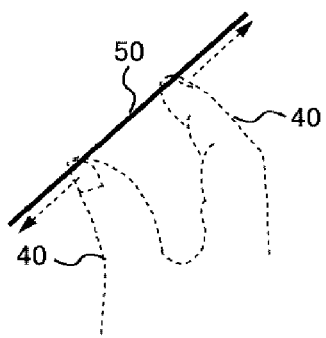
Figure 9D:
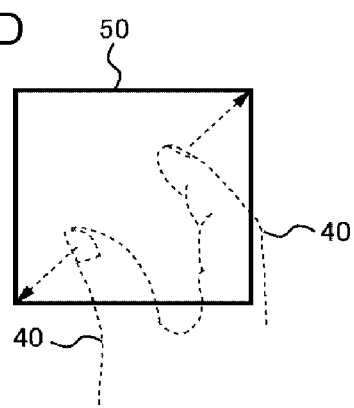

FIG. 9C shows a situation where an event detection position 50 indicated by a line is specified by a pinch-out operation. FIG. 9D shows a situation where an event detection position 50 indicated by a rectangular region is specified by the same operation as in FIG. 9C. In a case where the operation of FIG. 9C or FIG. 9D is processed by the second processing unit 2040, for example, the second processing unit 2040 enlarges the surveillance image or the window including the surveillance image. Further, in the case of a pinch-in operation, contrary to a pinch-out operation, the second processing unit 2040 reduces the surveillance image or the window including the surveillance image.

Figure 9E:
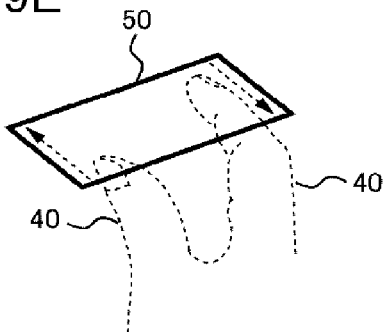

FIG. 9E shows a situation where an event detection position 50 indicated by a rectangular region is specified by a rotating operation. In a case where the operation of FIG. 9E is processed by the second processing unit 2040, for example, the second processing unit 2040 rotates the surveillance image or the window including the surveillance image.

Figure 9F:
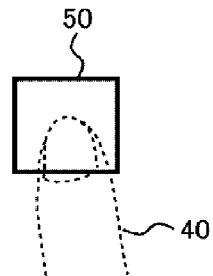

FIG. 9F shows a situation where an event detection position 50 indicated by a rectangular region is specified by a touch operation. In a case where the operation of FIG. 9F is processed by the second processing unit 2040, for example, the second processing unit 2040 becomes a selection operation with respect to the surveillance image or the window including the surveillance image.

Here, the first operation is not limited to the respective operations shown in FIGS. 9A-9F. Further, the event detection positions 50 specified by the respective first operations are not limited to the examples of FIGS. 9A-9F. For example, the event detection position 50 specified by the operation of drawing the line in FIG. 9A or the like may be a rectangular region or the like formed by giving a predetermined width to the line. Further, the event detection position 50 specified by the operation of drawing the region in FIG. 9B or the like is not limited to the rectangular shape. For example, in FIG. 9B, the event detection position 50 may be a circle the diameter of which is the track of a finger. In addition, the event detection position 50 specified by the touch operation of FIG. 9F may be a dot or a region having a shape (circle or the like) other than the rectangular shape.

How the event detection positions are set by the respective operations may be determined in advance in the information processing apparatus 2000 that is implemented with the mobile apparatus. For example, which one of the event detection positions shown in FIG. 9A and FIG. 9B is to be set by the first operation of drawing a line using the finger 40 and which one of the event detection positions shown in FIG. 9C and FIG. 9D is to be set by the pinch-out operation may be defined in advance.

<<Details of Event Detection Position Information>>

Event detection position information regarding an event detection position indicated by a line or a region represents a combination of coordinates that represent the event detection position. A variety of methods are known as a method for representing a line or a region by a combination of coordinates. The first processing unit 2020 represents an event detection position indicated by a line or a region using such known methods. Description about the known methods will not be made herein.

Coordinates that represent an event detection position are, for example, coordinates on a surveillance image (camera coordinates). In another example, the coordinates may be coordinates on areal space corresponding to the coordinates on the surveillance image. For example, the coordinates on the real space are global positioning system (GPS) coordinates. In another example, the coordinates on the real space may be coordinates determined on a floor map in a facility. The coordinates on the real space corresponding to the coordinates on the surveillance image and the coordinates on the surveillance image may be converted into each other using various parameters relating to the camera that generates a surveillance image (including: a position of the camera in the real space; a posture, an angle of view, or the like of the camera; inner parameters; and the like, which are hereinafter referred to as "camera parameters").

In a case where setting of an event detection position is performed on a surveillance image, and in a case where the event detection position is represented by coordinates on the real space, the above-mentioned camera parameters are acquired from a storage being inside or outside the information processing apparatus 2000, for example. Then, the first processing unit 2020 calculates the coordinates on the real space corresponding to the coordinates on the surveillance image. A method for converting coordinates on an image into coordinates on the real space using the above-mentioned camera parameters may employ various known methods. Description about the known methods will not be made herein. In a case where setting of an event detection position is performed on a map or a floor map shown in FIG. 5, the first processing unit 2020 may directly acquire GPS coordinates or floor map coordinates.

Note that, when a plurality of surveillance cameras acquire respective surveillance images, GPS coordinates or floor map coordinates may be common coordinates of camera coordinates of the plurality of surveillance cameras.

For example, the first processing unit 2020 writes event detection position information into the storage being inside or outside the information processing apparatus 2000. In another example, the first processing unit 2020 may transmit the event detection position information to a surveillance system or the like that uses the event detection position information.

<Details of Control Unit 2060>

As described above, the control unit 2060 causes any one of the first processing unit 2020 and the second processing unit 2040 to process the first operation. Hereinafter, a state of the information processing apparatus 2000 in a case where the control unit 2060 causes the first processing unit 2020 to process the first operation is referred to as an "event position setting mode". Further, a state of the information processing apparatus 2000 in a case where the control unit 2060 causes the second processing unit 2040 to process the first operation is referred to as a "display change mode". In addition, a state of the information processing apparatus 2000 in a case where the display change process accompanied by the above-mentioned PTZ camera control is referred to not only as the "display change mode" but also as a "PTZ camera control mode".

A method for determining which one of the first processing unit 2020 and the second processing unit 2040 is caused to process the first operation by the control unit 2060, that is, a method for performing switching between the display change mode and the event detection position setting mode may employ various methods. For example, the control unit 2060 determines which one of the first processing unit 2020 and the second processing unit 2040 is caused to process the first operation on the basis of a second operation performed by a user. Specific content of the second operation will be described later. In another example, the control unit 2060 determines which one of the first processing unit 2020 and the second processing unit 2040 is caused to process the first operation on the basis of the posture of the information processing apparatus 2000.

<<Example 1 of Mode Switching Based on Second Operation>>

The control unit 2060 may cause any one of the first processing unit 2020 and the second processing unit 2040, which is different from a normal one of them, to temporarily process the first operation on the basis of the second operation performed by a user. That is, the control unit 2060 temporarily switches the display change mode into the event detection position setting mode on the basis of the second operation performed by the user. Or, the control unit 2060 temporarily switches the event detection position setting mode into the display change mode on the basis of the second operation performed by the user.

In this case, for example, the second operation may be an operation of pressing a start position of the first operation for a predetermined time or longer. For example, it is assumed that the first operation is an operation of sliding a finger with respect to a surveillance image. In this case, for example, a user presses a certain place on a surveillance image for the predetermined time or longer (long push), and then, starts the operation of sliding the finger with the state where the place is pressed. Here, the second operation temporarily switches the display change mode into the event detection position setting mode on the basis of the second operation that is an "operation of pressing (long push) a certain place on a surveillance image for a predetermined time or longer". Thus, the control unit 2060 causes the first processing unit 2020 to process a subsequent operation of sliding the finger. As a result, for example, a video surveillance line is superimposed on the surveillance image along a track of the sliding of the finger.

Alternatively, for example, in a case where a user presses a certain place of a surveillance image through long push by two fingers, and then starts a pinch-out operation, the control unit 2060 causes the first processing unit 2020 to process the pinch-out operation. As a result, for example, a surveillance region is set on the surveillance image according to a range where the pinch-out operation is performed.

Figure 10:
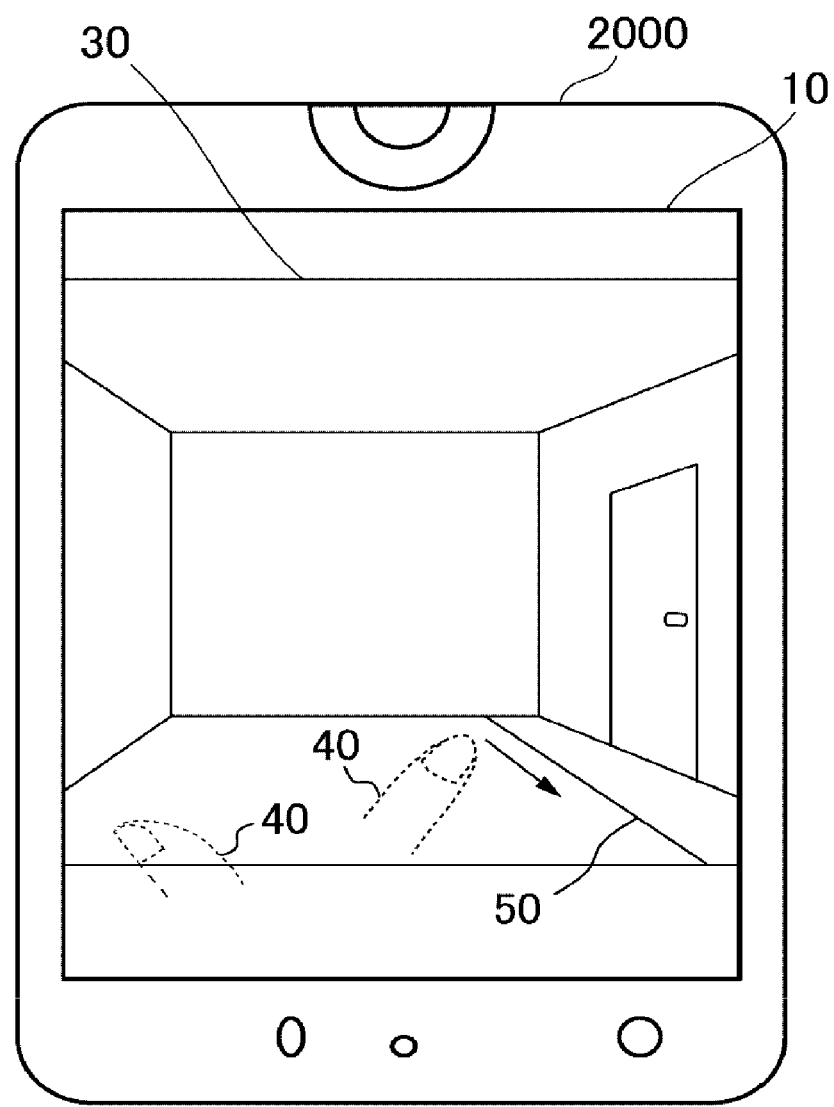
FIG. 10 is a diagram showing a situation where a video surveillance line is superimposed while touching a lower left of a surveillance image.

The control unit 2060 may perform a control for that "the first processing unit 2020 is caused to process the first operation performed during the second operation being received whereas the second processing unit 2040 is caused to process the first operation performed during the second operation not being received, the second operation being started before the first operation and being continuously performed during operation of the first operation". For example, in a case where an operation of sliding a finger is performed during the lower left of the touch panel 10 (or the lower left of the surveillance image or the like displayed on the touch panel 10) being touched, the control unit 2060 causes the first processing unit 2020 to temporarily process the operation. That is, it becomes the event detection position setting mode while the lower left of the touch panel 10 is touched and the touch is continued, and the operation of sliding the finger is handled as an operation of specifying an event detection position. On the other hand, in a case where the operation of sliding the finger is performed during the lower left of the touch panel 10 not being touched (a normal state), the control unit 2060 causes the second processing unit 2040 to process the operation. That is, it is in the display change mode in the normal state, and the operation of sliding the finger is handled as an operation for performing a display change process such as scroll or the like of the surveillance image. In the normal state (display change mode), in a case where the lower left of the screen is touched and an operation of sliding a finger is performed while the touch is continued, it temporarily becomes the event detection position setting mode, and a video surveillance line is superimposed on the surveillance image along the track of the sliding of the finger. FIG. 10 is a diagram showing a situation where a video surveillance line (an event detection position 50) is superimposed while touching the lower left of the surveillance image.

In another example, in a case where a pinch-out operation is performed on a surveillance image during the lower left of the touch panel 10 being touched, the control unit 2060 causes the first processing unit 2020 to process the pinch-out operation. As a result, for example, a surveillance region is set on the surveillance image in accordance with a range where the pinch-out operation is performed.

<<Example 2 of Mode Switching Based on Second Operation>>

The control unit 2060 may perform switching between the display change mode and the event detection setting mode on the basis of the second operation performed by a user, according to various patterns other than the above description. For example, "switching through long push" described above may not be temporary switching, and the display change mode and the event detection position setting mode may be switched therebetween through every long push.

As another switching pattern, for example, the control unit 2060 may cause the second processing unit 2040 to process the first operation (display change mode) before receiving the second operation, and may cause the first processing unit 2020 to process the first operation (event detection position setting mode) after receiving the second operation. From a user's point of view, the second operation is performed so as not to perform the display change process of the surveillance image or the like, and then, the event detection position is specified. For example, a user performs the second operation so that the surveillance image is not scrolled (stops scroll of the surveillance image), and then, performs an operation of drawing a line for specifying an event detection position.

For example, the second operation may be an operation of touching a surveillance image, a map image, or a window including the surveillance image or the map image for a predetermined time or longer. The second operation may be received at an arbitrary place on an image such as a surveillance image, or may be received only at a predetermined place on a surveillance image or the like. The predetermined place may correspond to four corners or the like on the surveillance image or the like.

In another example, the second operation may be an operation of touching the touch panel 10 for a predetermined time or longer. The second operation may be received at an arbitrary place on the touch panel 10, or may be received only at a predetermined place on the touch panel 10. The predetermined place corresponds to four corners or the like of the touch panel 10, for example. The "operation of touching the touch panel 10" also includes a touch operation with respect to a place at which it is not displayed a surveillance image, a map image, or a window including the surveillance image or the map image, unlike an "operation of touching a surveillance image, a map image, or a window including a surveillance image or a map image".

In another example, the second operation may be an operation of touching a plurality of places on the surveillance image or the like or the touch panel 10 at the same time or in a predetermined order. For example, the second operation is an operation of touching four corners on the display screen in the order of the upper left, the upper right, the lower right, and the lower left. The plurality of places may be arbitrary places, or may be predetermined places.

In another example, the second operation may be an input of a predetermined audio. In this case, the information processing apparatus 2000 acquires an audio input from a microphone or the like, and determines whether or not the audio corresponds to the predetermined audio. Further, the control unit 2060 causes the first processing unit 2020 to process the first operation after the predetermined audio is input (after the second operation is performed). A method for determining whether or not an audio input from a user corresponds to a predetermined audio may employ various known audio analysis techniques. Description about the known techniques will not be described herein.

In another example, the second operation may be an operation with respect to a hardware button (a volume change button or a power source button) included in a mobile apparatus. For example, the operation is an operation of pressing a hardware button for a long time, an operation of pressing a plurality of hardware buttons in a predetermined order, or the like. The hardware button may be a general hardware button such as a volume change button, or may be a specific hardware button provided for the second operation.

In a case where a predetermined condition is satisfied after transitioning to "a state of causing the first processing unit 2020 to process the first operation" with the second operation, the control unit 2060 may transition to "a state of causing the second processing unit 2040 to process the first operation". For example, the predetermined condition is a condition that "the second operation is performed again". Here, the second operation of causing the control unit 2060 to transition to the "state of causing the first processing unit 2020 to process the first operation" and the second operation of causing the control unit 2060 to transition to the "state of causing the second processing unit 2040 to process the first operation" may be the same operation, or may be different operations. In another example, in a case where a predetermined time elapses after entering the "state of causing the first processing unit 2020 to process the first operation", the control unit 2060 transitions to the "state of causing the second processing unit 2040 to process the first operation". In another example, in a case where a state where the first operation is not detected is continued for a predetermined time or longer after entering the "state of causing the first processing unit 2020 to process the first operation", the control unit 2060 transitions to the "state of causing the second processing unit 2040 to process the first operation".

Further, the control unit 2060 may perform a control for "causing the first processing unit 2020 to process the first operation before the second operation is received and causing the second processing unit 2040 to process the first operation after the second operation is received", contrary to the above description.

<<Example of Mode Switching Based on Posture of Information Processing Apparatus 2000>>

For example, in a case where the posture of the information processing apparatus 2000 is a predetermined first posture, the control unit 2060 causes the first processing unit 2020 to perform the first operation in the event detection position setting mode. In a case where the posture of the information processing apparatus 2000 is a second posture different from the first posture (for example, any posture other than the first posture), the control unit 2060 may cause the second processing unit 2040 to process the first operation in the display change mode.

Since the posture of a mobile apparatus is easily changed, a user may easily distinguish between an operation of setting an event detection position and a process of changing display of a surveillance image or the like.

Figure 11A:
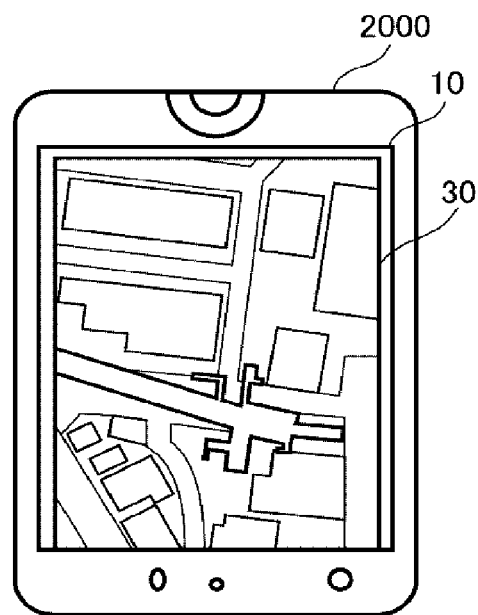
FIGS. 11A and 11B are diagrams illustrating a posture of an image processing apparatus.
Figure 11B:
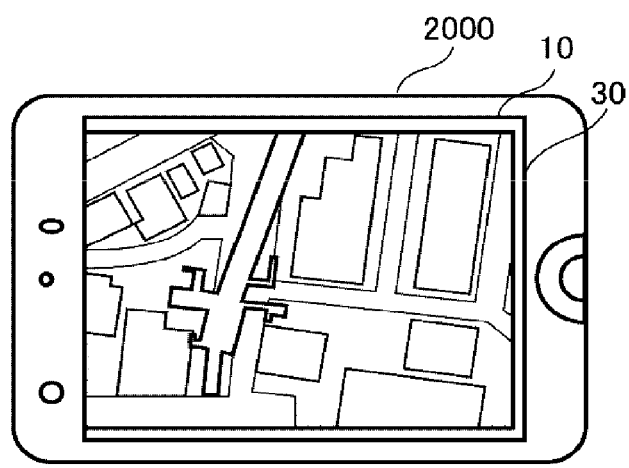

Generally, a mobile apparatus has a shape (approximately rectangular shape, or the like) in which a longitudinal length and a transverse length are different from each other in a planar view. Thus, for example, in the information processing apparatus 2000, a posture in which the long side of the information processing apparatus 200 is transversely disposed (a posture in which the information processing apparatus 2000 is transversely long) is considered as the first posture and a posture in which the long side of the information processing apparatus 2000 is longitudinally disposed (a posture in which the information processing apparatus 2000 is longitudinally long) is considered as the second posture. That is, in this case, when a user wants to perform scroll or the like with respect to the surveillance image, the user performs the operation while holding the information processing apparatus 2000 so that the information processing apparatus 2000 is longitudinally long. On the other hand, when the user wants to set an event detection position, the user performs the operation while holding the information processing apparatus 2000 so that the information processing apparatuses 2000 is transversely long. FIGS. 11A and 11B are diagrams illustrating postures of the information processing apparatus 2000. FIG. 11A illustrates a posture in which the long side of the information processing apparatus 2000 is longitudinally disposed, and FIG. 11B illustrates a posture in which the short side of the information processing apparatus 2000 is longitudinally disposed.

<Various Predetermined Values>

The various predetermined values (predetermined operations, predetermined widths, or predetermined times, or the like) in the above description are set in advance in functional components that use the values, for example. In another example, the predetermined values are stored in a storage apparatus provided inside or outside the information processing apparatus 2000. In this case, the respective functional components acquire predetermined values to be used from the storage apparatus.

<Example of Usage Method of Information Processing Apparatus 2000>

Surveillance using the mobile apparatus with which the information processing apparatus 2000 is implemented is used for surveillance operations at a place that is not usually required to be monitored, but is temporarily required to be monitored. For example, even in a place that is peaceful and not usually required to be monitored, there is a case where surveillance is necessary for a period of time when any event (fireworks festival, or the like) is held. Further, in such a case, positions to be monitored may vary according to kinds or the like of events to be held, and may be changed in real time. Thus, it may be preferable to operate a surveillance system capable of simply and temporarily setting and changing event detection positions using a simple method using the touch panel of the mobile apparatus, rather than to constantly operate a large-scale surveillance system in which event detection positions are fixed. According to the information processing apparatus 2000, it is possible to easily set an event detection position by a touch operation or the like. Thus, the information processing apparatus 2000 is suitable for such a case.

A usage of the surveillance using the mobile apparatus in which the information processing apparatus 2000 is implemented is not limited to the above-described method used in a temporary surveillance operation. For example, a mobile surveillance system in which the information processing apparatus 2000 is implemented may be used for setting of event detection positions or the like as a surveillance system constantly operated. For example, there is a case where an observer temporarily leaves her or his position due to circumstances. In this case, the observer sets the position as the event detection position using the information processing apparatus 2000. Thus, it is possible to prevent an event that occurs when the observer leaves the position from being overlooked. Further, in a case where a manager who runs a store wants to survey a state in the store at night, for example, similarly, surveillance using the mobile apparatus is highly convenient.

EXAMPLES

Figure 12:
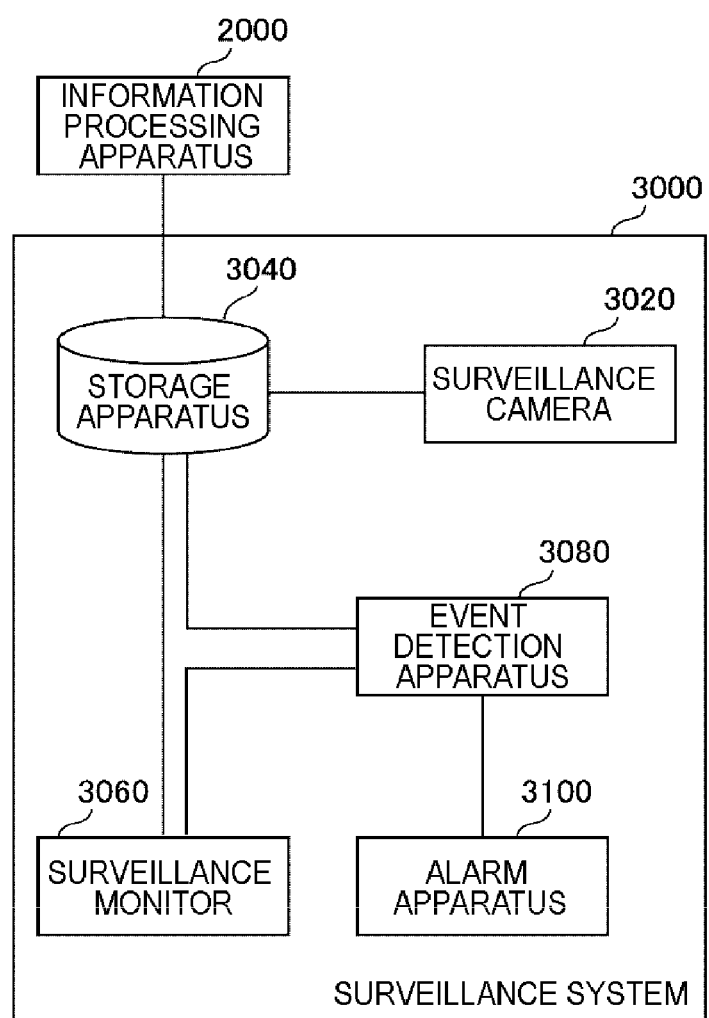
FIG. 12 is a block diagram illustrating a surveillance system and an information processing apparatus.

Hereinafter, a surveillance system 3000 that uses the information processing apparatus 2000 is illustrated. FIG. 12 is a block diagram illustrating the surveillance system 3000 and the information processing apparatus 2000. A surveillance system that uses the information processing apparatus 2000 is not limited to the surveillance system to be described hereinafter.

The surveillance system 3000 includes a surveillance camera 3020, a storage apparatus 3040, an event detection apparatus 3060, a surveillance monitor 3080, and an alarm apparatus 3100. The storage apparatus 3040 stores a surveillance image captured by the surveillance camera 3020. Further, the storage apparatus 3040 also stores event detection position information generated by the first processing unit 2020. The surveillance camera 3020 is a camera that generates a video. Thus, the storage apparatus 3040 stores frames that form the video generated by the surveillance camera 3020.

Figure 13:
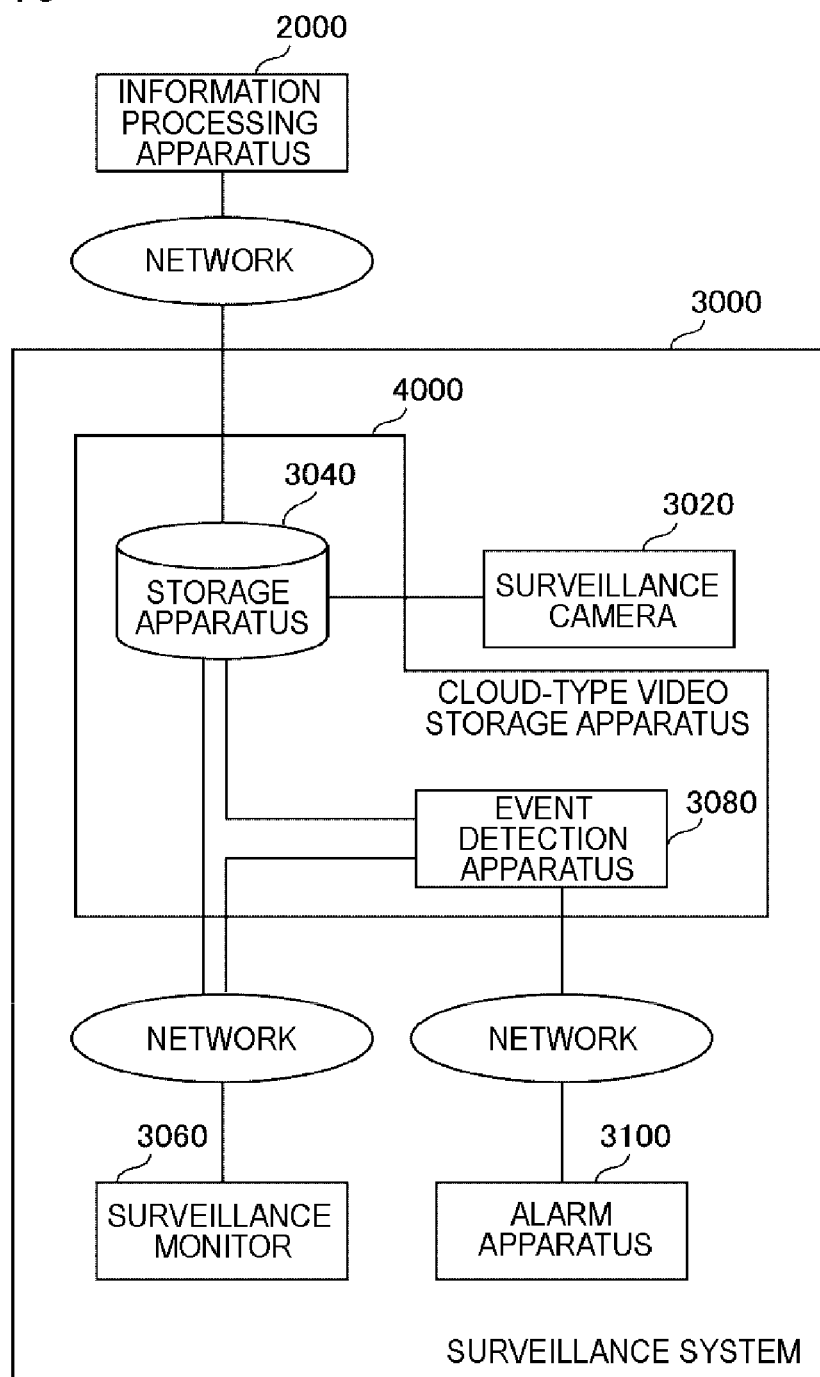
FIG. 13 is a block diagram illustrating a surveillance system that includes a cloud-type video storage apparatus.

The storage apparatus 3040 and the event detection apparatus 3060 may be implemented as a cloud-type video storage apparatus, for example. FIG. 13 is a block diagram illustrating the surveillance system 3000 that includes a cloud-type video storage apparatus 4000. The cloud-type video storage apparatus 4000 receives information indicating event detection positions from the information processing apparatus 2000 through a network, and stores the information in the storage apparatus 3040. Further, the cloud-type video storage apparatus 4000 stores surveillance images generated by the surveillance camera 3020 in the storage apparatus 3040. Further, the event detection apparatus 3060 of the cloud-type video storage apparatus 4000 performs event detection with respect to the surveillance images stored in the storage apparatus 3040 using the event detection positions stored in the storage apparatus 3040. Further, the cloud-type video storage apparatus 4000 performs notification of a result of the event detection to the surveillance monitor 3080 or the alarm apparatus 3100 through a network, for example.

Each network that connects the cloud-type video storage apparatus 4000 to the information processing apparatus 2000, the surveillance monitor 3080, and the alarm apparatus 3100 may be a wide area network (WAN) such as the Internet, or may be a local area network (LAN).

The cloud-type video storage apparatus 4000 and the surveillance camera 3020 may be connected to each other through a network, or may be directly connected to each other through a bus. The network may be either a WAN or a LAN.

Figure 14:
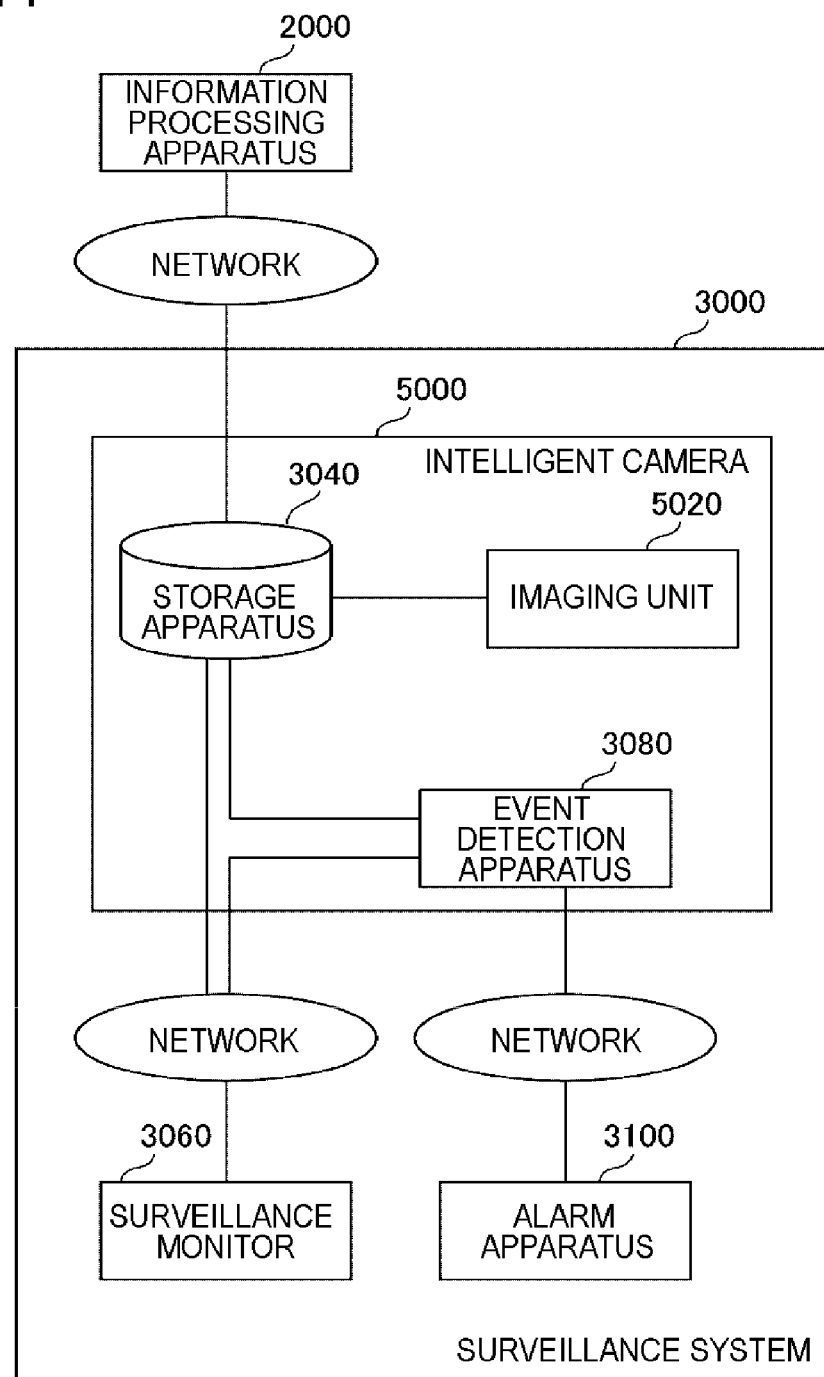
FIG. 14 is a block diagram illustrating a surveillance system that includes an intelligent camera.

Further, the surveillance camera 3020 may be implemented as an intelligent camera including the storage apparatus 3040 and the event detection apparatus 3060 therein. FIG. 14 is a block diagram illustrating the surveillance system 3000 that includes an intelligent camera 5000. An imaging unit 5020 is a functional component that realizes the above-mentioned functions of the surveillance camera 3020. The intelligent camera 5000 is connected to each of the information processing apparatus 2000, the surveillance monitor 3080, and the alarm apparatus 3100 through a network, in a similar way to the cloud-type video storage apparatus 4000. The network may be either a WAN or a LAN.

In the example, the information processing apparatus 2000 is a tablet terminal. The information processing apparatus 2000 displays the surveillance image acquired from the storage apparatus 3040 on the touch panel 10. A user performs an operation using a finger, a touch pen, or the like with respect to the touch panel 10 of the information processing apparatus 2000. In this example, the control unit 2060 causes the first processing unit 2020 to perform the first operation in a case where the first operation is performed after a starting position of the first operation is continuously pressed for one second. That is, in this case, the first operation is handled as an operation of specifying an event detection position. A long push time is not limited to one second and may be 1.5 seconds, 2 seconds, or several seconds.

FIGS. 15A and 15B and FIGS. 16A and 16B are diagrams illustrating a surveillance image 30 displayed on the touch panel 10 in an example. In the surveillance image 30 in FIG. 15A, one door 70-1 is shown on a left side. A user desires to specify a door 70-2 in front of the door 70-1, which is not shown on the surveillance image 30 in FIG. 15A, as an event detection position.

Figure 15A:
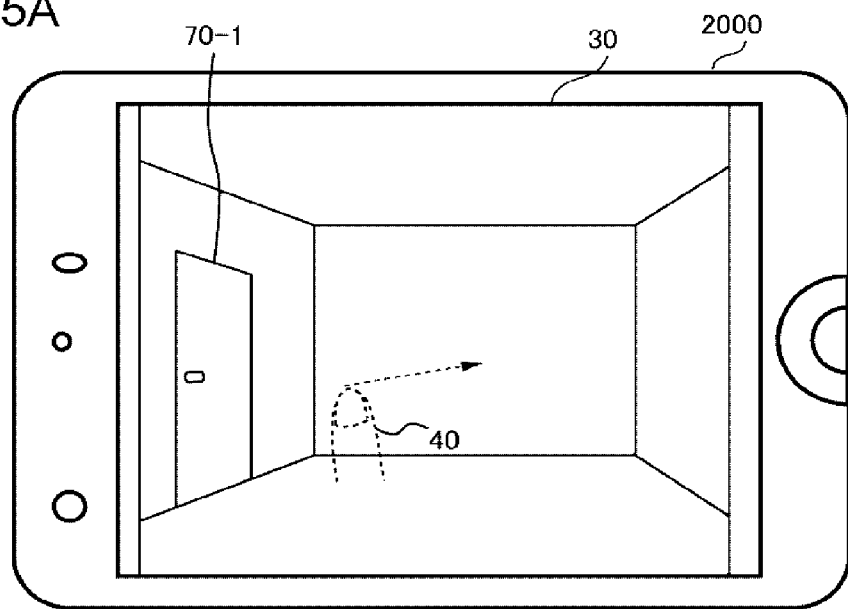
FIGS. 15A and 15B are first diagrams illustrating a surveillance image displayed on a display screen in an example.
Figure 15B:
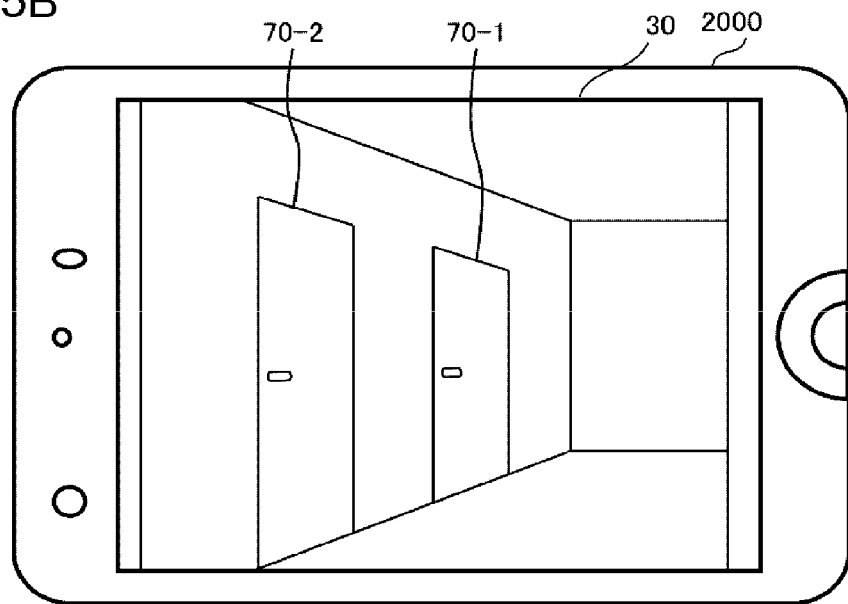

First, as shown in FIG. 15A, the user performs an operation of sliding the finger 40 with respect to the surveillance image 30 to scroll the surveillance image 30. As a result, as shown in FIG. 15B, the door 70-2 is displayed on the surveillance image 30.

Figure 16A:
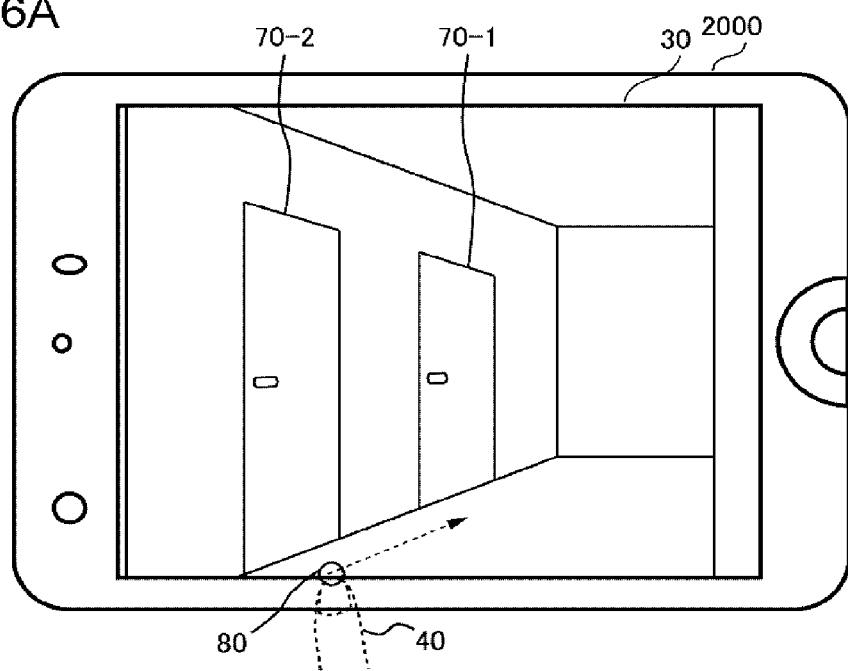
FIGS. 16A and 16B are second diagrams illustrating a surveillance image displayed on a display screen in an example.
Figure 16B:
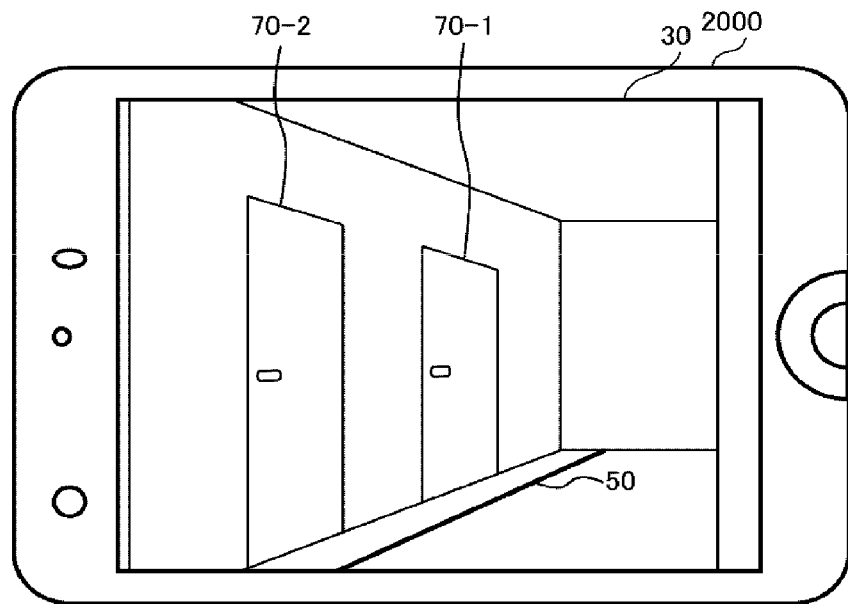

Then, as shown in FIG. 16A, a user performs an operation of drawing a video surveillance line with respect to the surveillance image 30. Here, the user continuously presses a starting point 80 for one second or longer, and then, slides the finger 40. Then, as shown in FIG. 16B, the event detection position 50 is set with respect to the door 70-2. Event detection position information indicating the event detection position 50 is stored in the storage apparatus 3040.

The event detection apparatus 3060 acquires event detection position information stored in the storage apparatus 3040. Further, the event detection apparatus 3060 detects that a predetermined event (crossing over the video surveillance line) occurs at the event detection position. In this example, for example, the event detection apparatus 3060 detects a person getting into or out of the door 70-1 or the door 70-2.

For example, the event detection apparatus 3060 is a computer that performs image analysis. In this case, the event detection apparatus 3060 acquires a surveillance image from the storage apparatus 3040, and analyzes the surveillance image. For example, the event detection apparatus 3060 acquires a plurality of surveillance images generated by the same surveillance camera 3020, and analyzes a position corresponding to the event detection position in each surveillance image. Further, in a case where a change indicating a predetermined event is detected at the position, the event detection apparatus 3060 detects that the predetermined event occurs. In the case of this example, the event detection apparatus 3060 detects, for example, a person getting into or out of the door 70-2 by analyzing the vicinity of the door 70-2. Here, a technique for detecting that a predetermined event occurs by analyzing images may employ known techniques.

Further, for example, the event detection apparatus 3060 is a sensor such as an infrared sensor. For example, the sensor detects an event such as crossing over by an object. For example, the sensor is disposed at each place of surveillance targets. In a case where event detection position information is generated by the information processing apparatus 2000, the sensor disposed at the event detection position indicated by the event detection position information or in the vicinity thereof starts surveillance. For example, in the case of this example, an infrared sensor is provided in the vicinity of each door 70, for example. Further, in a case where the event detection position 50 shown in FIG. 16B is specified, the sensor disposed in the vicinity of the door 70-2 starts surveillance.

In a case where an event is detected by the event detection apparatus 3060, information on the detection is notified to the information processing apparatus 2000 (tablet terminal), the surveillance monitor 3080, and the alarm apparatus 3100. The surveillance monitor 3080 is a monitor provided in a security room or the like, for example. For example, the surveillance monitor 3080 notifies an observer of occurrence of an event by emphasizing display of the surveillance video in which the position where the event is detected is shown, for example. Accordingly, the observer can easily recognize the place where the event occurs.

The alarm apparatus 3100 sounds an alarm to notify an observer of occurrence of an event, for example. The observer can know the occurrence of the event through the alarm.

Further, the surveillance monitor 3080 may acquire event detection position information from the storage apparatus 3040, and may display the event detection position on the surveillance image. Thus, for example, an observer can perform a surveillance operation while watching the event detection position. Further, the observer can cause the event detection apparatus 3060 to detect the occurrence of the event at the event detection position, and can perform a surveillance operation while watching a place other than the event detection position.

The example embodiments of the present invention have been described with reference to the accompanying drawings, but these embodiments are only examples of the present invention, and various configurations other than the above description may be employed.

Hereinafter, examples of reference embodiments will be appended.

1. A mobile surveillance apparatus including:
   a first processing unit setting an event detection position with respect to a surveillance image, in accordance with a first operation with respect to the surveillance image displayed on a display screen;
   a second processing unit performing a display change process with respect to the surveillance image or a window including the surveillance image in accordance with the first operation, the display change process being other than the setting of the event detection position; and
   a control unit causing any one of the first processing unit and the second processing unit to process the first operation on the basis of a second operation.

2. The mobile surveillance apparatus according to 1, wherein the control unit causes the second processing unit to process the first operation before the second operation is performed, and causes the first processing unit to process the first operation after the second operation is performed.

3. The mobile surveillance apparatus according to 2, wherein the second operation is a touch operation for a predetermined time or longer with respect to an arbitrary place on the display screen or the surveillance image.

4. The mobile surveillance apparatus according to 2, wherein the second operation is an operation of touching a starting position of the first operation for a predetermined time or longer.

5. The mobile surveillance apparatus according to 1,
   wherein the second operation is a touch operation with respect to an arbitrary place on the display screen, the touch operation being started before the first operation and being continuously performed while the first operation is being performed, and
   wherein the control unit causes the first processing unit to process the first operation while the second operation is being performed, and causes the second processing unit to process the first operation in a case where the second operation is not performed.

6. A mobile surveillance apparatus including:
   a first processing unit setting an event detection position with respect to a surveillance image, in accordance with a first operation with respect to the surveillance image displayed on a display screen;
   a second processing unit performing a display change process with respect to the surveillance image or a window including the surveillance image in accordance with the first operation, the display change process being other than the setting of the event detection position; and
   a control unit causing any one of the first processing unit and the second processing unit to process the first operation,
   wherein the control unit causes the first processing unit to process the first operation in a case where a posture of the mobile surveillance apparatus is a first posture, and causes the second processing unit to process the first operation in a case where the posture of the mobile surveillance apparatus is a second posture different from the first posture.

7. The mobile surveillance apparatus according to any one of 1 to 6,
   wherein the event detection position represents a position of a video surveillance line for detecting an object crossing thereover or a position of a surveillance region for detecting a predetermined event of an object.

8. A program for causing a computer to operate as the mobile surveillance apparatus according to any one of 1 to 7.

9. A control method executed by a computer, including:
   a first processing step of setting an event detection position with respect to a surveillance image, in accordance with a first operation with respect to the surveillance image displayed on a display screen;
   a second processing step of performing a display change process with respect to the surveillance image or a window including the surveillance image in accordance with the first operation, the display change process being other than the setting of the event detection position; and
a control step of causing any one of the first processing step and the second processing step to process the first operation on the basis of a second operation.

10. The control method according to 9, wherein the control step causes the second processing step to process the first operation before the second operation is performed, and causes the first processing step to process the first operation after the second operation is performed.

11. The control method according to 10, wherein the second operation is a touch operation for a predetermined time or longer with respect to an arbitrary place on the display screen or the surveillance image.

12. The control method according to 10,
wherein the second operation is an operation of touching a starting position of the first operation for a predetermined time or longer.

13. The control method according to 9,
wherein the second operation is a touch operation with respect to an arbitrary place on the display screen, the touch operation being started before the first operation and being continuously performed while the first operation is being performed, and
wherein the control step causes the first processing step to process the first operation while the second operation is being performed, and causes the second processing step to process the first operation in a case where the second operation is not performed.

14. A control method executed by a computer, including:
a first processing step of setting an event detection position with respect to a surveillance image in accordance with a first operation with respect to the surveillance image displayed on a display screen;
a second processing step of performing a display change process with respect to the surveillance image or a window including the surveillance image in accordance with the first operation, the display change process being other than the setting of the event detection position; and
a control step of causing any one of the first processing step and the second processing step to process the first operation,
wherein the control step causes the first processing step to process the first operation in a case where a posture of the computer is a first posture, and causes the second processing step to process the first operation in a case where the posture of the computer is a second posture different from the first posture.

15. The control method according to any one of 9 to 14, wherein the event detection position is a position of a video surveillance line for detecting an object crossing thereover or a position of a surveillance region for detecting a predetermined event of an object.

The invention claimed is:

1. A mobile surveillance apparatus comprising:
a touch panel display;
at least one processor configured to:
set an event detection position with respect to a surveillance image, in accordance with a first operation performed with respect to the surveillance image displayed on the touch panel display when a predetermined condition is satisfied; and
perform a display change process with respect to the surveillance image or a window including the surveillance image when the predetermined condition is not satisfied and the first operation is performed, the display change process being other than the setting of the event detection position,
wherein at least one of the first operation and the predetermined condition is performed by contacting the touch panel display.

2. The mobile surveillance apparatus according to claim 1, wherein the event detection position is set in accordance with the first operation after the predetermined condition is satisfied.

3. The mobile surveillance apparatus according to claim 2, wherein the predetermined condition is a touch operation for a predetermined time or longer on the touch panel display or the surveillance image.

4. The mobile surveillance apparatus according to claim 3, wherein the touch operation is performed with respect to an arbitrary place on the touch panel display or the surveillance image.

5. The mobile surveillance apparatus according to claim 2, wherein the predetermined condition is a touching operation performed at a starting position of the first operation and performed for a predetermined time or longer.

6. The mobile surveillance apparatus according to claim 1,
wherein the predetermined condition is a touch operation with respect to an arbitrary place on the touch panel display, the touch operation being started before the first operation and being performed while the first operation is being performed.

7. The mobile surveillance apparatus according to claim 1, wherein the event detection position represents a position of a video surveillance line for detecting an object crossing thereover or a position of a surveillance region for detecting a predetermined event relating to an object.

8. A non-transitory computer-readable storage medium storing a program that when executed by a computer operates the mobile surveillance apparatus according to claim 1.

9. The mobile surveillance apparatus according to claim 1, wherein the mobile surveillance apparatus is a smartphone, a tablet or a laptop computer.

10. The mobile surveillance apparatus according to claim 9, wherein the first operation is a slide operation on the touch panel display.

11. The mobile surveillance apparatus according to claim 10, wherein the predetermined condition is the touch operation initiated on the touch panel display before the first operation begins and continues after the first operation begins.

12. The mobile surveillance apparatus according to claim 9, wherein the predetermined condition is a touch operation initiated on the touch panel display before the first operation begins.

13. The mobile surveillance apparatus according to claim 1, wherein the predetermined condition is a touch operation performed at a plurality of places on the touch panel display in a predetermined order.

14. A control method executed by a computer, comprising:
a first processing step of setting an event detection position with respect to a surveillance image, in accordance with a first operation performed with respect to the surveillance image displayed on a touch panel display when a predetermined condition is satisfied; and
a second processing step of performing a display change process with respect to the surveillance image or a window including the surveillance image when the predetermined condition is not satisfied and the first operation is performed, the display change process being other than the setting of the event detection position, wherein at least one of the first operation and the predetermined condition is performed by contacting the touch panel display.

15. The control method executed by the computer according to claim 14, wherein the computer is a smartphone, a tablet or a laptop computer.

16. The control method executed by the computer according to claim 15, wherein the first operation is a slide operation on the touch panel display.

17. The control method executed by the computer according to claim 14, wherein the predetermined condition is a touch operation performed at a plurality of places on the touch panel display in a predetermined order.

18. A mobile surveillance apparatus comprising:
a touch panel display displaying a surveillance image;
at least one processor configured to:
set an event detection position with respect to the surveillance image, in accordance with a slide operation performed on the touch panel display when a touch operation is performed on the touch panel display prior to beginning the slide operation;
change a display range of the surveillance image when the touch operation on the touch panel display is not performed and the slide operation is performed.

19. The mobile surveillance apparatus according to claim 18, wherein the mobile surveillance apparatus is a smartphone, a tablet or a laptop computer.

20. The mobile surveillance apparatus according to claim 18, wherein the touch operation is performed at a plurality of places on the touch panel display in a predetermined order.

* * * * *